United States Patent Office 2,829,166
Patented Apr. 1, 1958

2,829,166

HYDROGENATION OF PHENOL

George G. Joris, Madison, and John Vitrone, Jr., West Paterson, N. J., assignors to Allied Chemical & Dye Corporation, New York, N. Y., a corporation of New York No Drawing. Application April 23, 1956
Serial No. 579,718

8 Claims. (Cl. 260—586)

This invention relates to the catalytic hydrogenation of phenol. In process devised hertofore for catalytic hydrogenation of phenol the reaction has proceeded through the intermediate cyclohexanone to yield as final hydrogenation product predominantly cyclohexanol with little or essentially none of the intermediate ketone. Heretofore when it has been desired to produce recoverable quantities of cyclohexanone from phenol as starting material, it has accordingly been the practice to form cyclohexanol by the hydrogenation of phenol and when to subject the reaction product to catalytic dehydrogenation.

It is an object of this invention to hydrogenate phenol selectively to cyclohexanone. Another object is to produce from phenol by hydrogenation procedure cyclohexanone and cyclohexanol as separately recovered products in controlled proportionate quantities. Other objects will be apparent from the description which follows.

In practice of the invention, phenol is reacted with hydrogen at temperature within the range of about 41° C. (the melting point of phenol) and about 150° C. in the presence of palladium catalyst. It has been discovered that conduct of phenol hydrogenation within these limits results, surprisingly, in the formation of cyclohexanone essentially exclusively, with little or no attendant formation of cyclohexanol. In fact, conduct of the process of the invention to complete or essentially complete consumption of phenol can result in formation of no more than very small quantities of products other than cyclohexanone.

At relatively low temperatures within the above range and at approximately atmospheric pressure of hydrogen the palladium catalyzed hydrogenation of phenol in accordance with the invention proceeds smoothly to formation of cyclohexanone substantially exclusively but at relatively low reaction velocities. Under such conditions reaction times (residence time within the reaction zone at reaction conditions) of up to or even above 72 hours are indicated, if a high attack on phenol is to be achieved. In the interest of reaction times of, say, 48 hours or less, or even down to 2 to 6 hours, it is preferred that reaction temperature be at least about 100° C. permissibly but not necessarily under superatmospheric hydrogen pressure which, however, for maximum selectivity, preferably does not exceed about 300 lbs./sq. inch gauge. Satisfactorily low reaction times with excellent selectivity of phenol conversion to cyclohexanone ordinarily result upon use of reaction temperatures within the range of 120° C. to 145° C., typically 130° C. to 140° C.

At reaction temperatures exceeding about 150° C., the palladium catalyzed hydrogenation of phenol changes markedly in character, tending strongly to proceed toward the formation of cyclohexanol to produce substantial and even preponderating proportionate quantities of this substance in terms of phenol consumed. Hydrogen pressure above about 300 lbs./sq. inch gauge tends to favor somewhat increase in the relative proportions of cyclohexanol to cyclohexanone in the hydrogenated product. Accordingly, although pressures exceeding this value may be used and a product obtained which is composed, in terms of consumed phenol, at least predominantly of cyclohexanone with correspondingly small proportionate quantities of cyclohexanol, it is preferred in practice of the invention that this level of pressure be not exceeded. Experience in practice of the invention has demonstrated that hydrogen pressures below this level, conveniently not above about 150 lbs./sq. inch gauge, are conducive of satisfactorily low reaction times and a very high degree of selectivity in the production of cyclohexanone.

The catalyst employed may be finely divided or colloidal palladium as such but, for economy and for convenience in its recovery and reuse, it is preferably extended or deposited upon an inert carrier or support, typical of which are carbon or alumina. The supported catalyst may contain conveniently from about 1% to about 10% palladium by weight, a satisfactory and typical catalyst containing about 5% by weight of this metal. The quantity of catalyst employed with respect to phenol is not critical and may range, for example, from 0.1 part to 10 or even 100 or more parts to each thousand parts by weight of phenol charge. In its preferred or supported form satisfactorily effective quantities of typical catalyst, 5% palladium on finely divided charcoal or alumina dispersed throughout the phenol, may be as low as 1 to 10 parts per 1,000 parts of phenol. In many instances 1 part of total catalyst (palladium plus support) per 1,000 parts of phenol, particularly when dispersed in finely divided form throughout the phenol, is adequate for conduct of the hydrogenation to complete consumption of the phenol.

In practice of the invention the molten phenol and hydrogen system at desired temperature and pressure are simply contacted for a suitable time and in any convenient manner with the catalyst in granular, powdered, or other form. Thus, the catalyst may be presented as a layer through which the reactants are passed, repeatedly if necessary. Preferably, however, in the interests of using minimum quantities of the inherently expensive palladium, the catalyst is dispersed in finely divided condition throughout a body of phenol maintained under selected hydrogen pressure and at selected temperature, if necessary with the aid of agitation, for the desired length of time. As will be appreciated by those skilled in the art, a convenient way of producing such a dispersion is to add finely divided catalyst to molten phenol prior to or after its admission to a batch or continuous reactor.

Selectivity of conversion of phenol to cyclohexanone by the catalytic hydrogenation step of the invention is outstandingly high, regardless of the extent of consumption of the phenol. For example, total reaction product obtainable, especially when operating under preferred conditions, to consumption of all but trace amounts of phenol is often composed of about 95% or more cyclohexanone, about 4% or less cyclohexanol, the balance being high boiling by-product and unconsumed phenol. However, when production of cyclohexanone alone is the object of operation, it is preferred to so control the hydrogenating conditions within the limits above set forth that at least 5% of the phenol remains unreacted and appears in the total reaction product. Higher phenol conversions are at the expense of reduced reaction rates and sometimes of increased, although still small amounts of, cyclohexanol in the total product. Termination of the reaction at about 95% consumption of original phenol results in product typically containing about 2% or less of cyclohexanol. Further, termination at somewhat lesser consumption of phenol, for example up to 70% or 80%, permits formation of total product containing even smaller, down to trace or no detectable, amounts of cyclohexanol.

Recovery of product cyclohexanone requires only simple distillation of the total reaction product under conditions, known or easily ascertainable by persons skilled in the art, which produce cyclohexanone as distillate. Conduct of ordinary fractionation, for example in a column containing 10 to 15 theoretical plates, to produce a residue containing a small amount of cyclohexanone in addition to unconsumed phenol and any small amount of cyclohexanol produced, ordinarily yields as distillate a cyclohexanone of purity sufficient to meet specifications for this substance for many, if not all, purposes as an intermediate, for example, for the formation of cyclohexanone oxime or adipic acid. Phenol forms an azeotrope with cyclohexanone in the approximate weight ratio of 2 to 1 parts of the former with respect to the latter. This azeotrope appears in the residue of a properly conducted fractionation.

As illustrative of the nature of products obtainable by conduct of the phenol hydrogenation step of the invention to about 95% consumption of phenol, such a product characteristically distills in a fractionating column containing 14 theoretical plates and operated at reflux temperature of 140° F. and pressure of 38 mm. Hg to yield for each 100 parts by weight of product about 91 parts of substantially pure cyclohexanone distillate. The 9 parts of residue is typically composed of phenol 5 parts, cyclohexanone 2 parts, cyclohexanol 1 part, and high boiling by-product 1 part. Such distillation residues and others typically obtained when the total reaction product contains about 5% or more of unreacted phenol may be recirculated directly to the hydrogenation reactor without intervening treatment, except permissibly flash evaporation to reject as liquid the high boiling by-products, for prolonged periods of operation without accumulating in the system objectionable quantities of cyclohexanol.

When, in accordance with certain aspects of the invention, it is desired to produce from a phenol separately recovered cyclohexanone and cyclohexanol, residue remaining from distillation of the palladium catalyzed hydrogenation product is subjected to catalytic hydrogenation under conditions which effect conversion of phenol to cyclohexanol. For this purpose the total residue from the distillation, or alternatively, the residue from which high boilers have been rejected, for example, by flash evaporation, is forwarded to a second hydrogenation zone and therein subjected in the presence of added hydrogen to conditions which effect this conversion. Suitable conditions include use of active hydrogenation catalyst in supported or unsupported form, typical active catalyst ingredients being platinum, Raney nickel, copper, and molybdenum oxide, at temperatures and pressures suitable for use with the particular catalyst, known to those skilled in the art, at which the desired cyclohexanol is formed. Typical conditions which may be used with active catalysts having the activity characteristics of finely divided Raney nickel include maintenance of the residue containing the catalyst dispersed therein in agitated condition at temperature within the range of 50° C. to 200° C. under hydrogen pressure adequate to keep the reaction mass liquid, for example, 50 to 300 lbs./sq. inch gauge. These reaction conditions are typically maintained until the total hydrogenated product or a distillate therefrom composed of cyclohexanol meets specifications in accordance with the well-known "cloud point" or other test determinative of acceptable purity of cyclohexanol.

When the two hydrogenation stages are employed, excellent control over the respective quantities of cyclohexanone and cyclohexanol obtained is conveniently achieved by limiting phenol consumption in the first hydrogenation zone to no more than about 70%. Although control of other reaction conditions in the first hydrogenation zone may be utilized for this purpose, a convenient control is of residence time within that zone. For example, when operating the initial hydrogenation step in the presence of about 1 part of 5% palladium-on-carbon catalyst per 1,000 parts of phenol with the catalyst suspended in powdered form within the reaction mixture at temperature of about 140° C. and under approximately atmospheric pressure of hydrogen, approximately 70% of the phenol is consumed during a reaction time of about 32 hours. Decreasing that time by approximately 8 hours results in phenol consumption of the order of 60%, and by a further 8 hours of about 50%. On the other hand, increase of the reaction time by 16 hours to 48, effects about 95% consumption of phenol.

Either continuous or batch techniques may be used in carrying out the invention, the necessary equipment involved being obvious to persons skilled in the art. For illustrative purposes, when producing cyclohexanone only, the single hydrogenating step may be conducted batchwise in one, or continuously in one or a series of, vertical cylindrical pressure vessels equipped for agitation and with a suitable diffusion distributor near the vessel bottom as well as with suitable cooling coils to remove heat of reaction. An inlet for phenol or from reaction product from another hydrogenation vessel containing dispersed catalyst may also be provided near the vessel bottom. A vent in the vessel top may be provided for discharge of unconsumed hydrogen and inert gases if present. For continuous operation overflow outlets for product may be provided at several preselected levels readily to permit control over residence time and hence over phenol conversion in each reaction vessel. For batch operation the liquid reactant inlet or a separate line leading to the vessel bottom may serve for product withdrawal. A distillation unit comprising a fractionator connected to the pressure vessel producing final hydrogenated product, preferably through a settling chamber or filter to remove catalyst from the product, completes the necessary equipment, with the possible exception of a connection from fractionator bottom to the reactor for recycle of residue with preferably a heater, flash evaporator, and condenser interposed in that connecting line for rejection of high boiling by-product and delivery of residue to the reactor in liquid phase.

When cyclohexanol is also produced an additional catalytic reactor or series of reactors suitably of the same type as the pressure vessels used in the first hydrogenation zone is provided and is connected to the fractionator bottoms outlet, or optionally, to the distillate discharge from the above-mentioned flash evaporator. A flash evaporating unit may follow the cyclohexanol reactor to remove high boiling by-products. When it is used the flash evaporator mentioned above may be by-passed or omitted.

*Example 1.*—Molten phenol containing per 1,000 parts, 1 part by weight of a finely divided catalyst composed of 5% palladium on charcoal support was maintained under agitation within a pressure vessel at temperature of 140° C. to 145° C. while adding hydrogen through a disperser located near the bottom of the liquid mass, at rate sufficient to maintain an excess of hydrogen at substantially atmospheric pressure, for a period of about 30 hours. At the end of this time the reactor was discharged, the product filtered to remove catalyst, and analyzed. It was found to be composed on a weight basis of about 20% phenol, 79% cyclohexanone and 1% cyclohexanol. This product, upon simple distillation, yielded as distillate up to 75 parts of substantially pure cyclohexanone.

*Example 2.*—Molten phenol containing about 1 part per 1,000 of 5% palladium-on-carbon catalyst was maintained at temperature of about 140° C. for a period of 48 hours while admitting hydrogen thereto at rate sufficient to provide an excess of this reactant at atmospheric pressure. After the end of 24 and 32 hours, and at the end of the 48 hour period, reaction product then obtained was analyzed and was found to contain cyclohexanone by weight in the respective amounts of 61%, 71% and 94%. The cyclohexanol content of these several products was below 0.2% at the end of the 24th and 32nd hours and was about 1% when the reaction had been continued for the full 48 hours. Traces of high boiling product occurred in the residues from distilling the first two samples to recover cyclohexanone and somewhat less than 1% of this type product in the final such residue. In each instance the remainder of the total reaction products was unreacted phenol.

Example 3.—Using the same catalyst as employed in the preceding example and the same quantity with respect to phenol, the mixture was maintained for a period of one hour at 150° C. and hydrogen pressure of about 300 lbs./sq. inch gauge. The total reaction product was found to contain about 25% phenol, about 70% cyclohexanone, and about 4% cyclohexanol, the remainder being high boiling by-product.

Example 4.—The reaction product of Example 3, upon being subjected to flash evaporation to reject the high boiling content thereof, was condensed and subjected at 150° C. to hydrogen pressure of about 65 lbs./sq. inch gauge while containing dispersed therein about 30 parts of Raney nickel catalyst to 1,000 parts of residue by weight until the reaction mixture ceased to absorb hydrogen. The total resulting product was oxidized to adipic acid of marketable quality.

Example 5.—Agitated molten phenol containing about 1 part per 1,000 of 5% palladium-on-carbon catalyst was maintained at temperature within the range of about 120–128° C. while bubbling hydrogen therethrough at rate sufficient to provide an excess of this reactant at atmospheric pressure for a period of about 40 hours. Samples of reaction product were taken and analyzed at the end of 21, 36, 37.5, 38.5, and 39.5 hours, respectively. The phenol contents of these samples were 38%, 5.6%, 3.0%, 1.6%, and 0.4%, and the cyclohexanol contents were 0.0%, 0.85%, 0.90%, 1.1%, and 1.3%. In each instance substantially the entire balance of reaction product was cyclohexanone.

Purity of phenol and catalyst used in producing cyclohexanone in accordance with the invention are factors influencing the selectivity of the hydrogenation. Phenol and catalyst, as free as possible of extraneous substances, are preferred for maximum selectivity; with commercially available pure grades of reactant and catalyst, consumption of all but trace quantities of phenol may be obtained with formation of less than 1.5% cyclohexanol in the product. It appears that caustic soda, iron and other heavy metal impurities which are present in or accumulate on the catalyst have definite adverse effect upon its selectivity. Accordingly, it is preferred that the catalyst and the reaction system be kept as free as possible of such impurities. If this be done, the catalyst may be reused many times without losing activity; in fact, often with improvement in its selectivity. Absence of impurities also reduces or eliminates catalyst induction periods often encountered when they are present.

It is to be understood that despite the desirability of absence of impurities within the reaction system of the invention, their presence does not necessarily prevent its satisfactory practice. Upon use of reasonably good grades of commercially available phenol and supported palladium catalyst yields of cyclohexanone which are ten or more times the yields of cyclohexanol in terms of phenol consumed, may be readily obtained.

Although several specific embodiments of the invention have been described above, it will be apparent to those skilled in the art that various modifications are intended to be within its scope. For instance, the palladium catalyzed hydrogenation of phenol to cyclohexanone may be effected while the phenol is present in solution in a solvent which is preferably inert with respect to hydrogen, phenol, cyclohexanone and cyclohexanol. A suitable solvent for this purpose is tetrahydronaphthalene. Typical of such solvents, it permits attainment of higher reaction velocities at a given set of reaction conditions without undue sacrifice of the selectivity of the reaction to produce cyclohexanone.

We claim:
1. The process of producing cyclohexanone comprising hydrogenating phenol at temperature within the range of 100° C. to 150° C. in the presence of catalyst containing palladium as the active ingredient and under pressure not in excess of about 300 lbs./sq. inch gauge.

2. Process according to claim 1 wherein the catalyst is palladium extended upon an inert support.

3. Process according to claim 2 wherein the catalyst in finely divided form is dispersed throughout the reaction mixture.

4. The process of producing cyclohexanone comprising hydrogenating phenol at temperature within the range of 100° C. to 150° C. and under pressure not in excess of about 300 lbs./sq. inch gauge in the presence of catalyst containing palladium as the active ingredient until substantially all the phenol has been hydrogenated, and separating cyclohexanone from the reaction product.

5. The process of producing cyclohexanone and cyclohexanol comprising hydrogenating phenol at temperature within the range of 100° C. to 150° C. and under pressure not in excess of about 300 lbs./sq. inch gauge in the presence of catalyst containing palladium as the active ingredient, arresting the reaction when on more than about 80% of the phenol has been hydrogenated, distilling cyclohexanone as product from the reaction mass to leave a residue composed essentially of phenol, cyclohexanone and cyclohexanol, and subjecting the residue to catalytic hydrogenation to convert the same to cyclohexanol.

6. Process according to claim 5 wherein the hydrogenation of the residue is effected in liquid phase in the presence of Raney nickel catalyst at temperature above about 50° C. and under pressure of at least about 50 lbs./sq. inch gauge.

7. The process of producing cyclohexanone comprising subjecting molten phenol at temperature within the range of 100° C. to 150° C. and under pressure not in excess of about 150 lbs./sq. inch gauge to hydrogenation in the presence of catalyst composed of palladium extended upon an inert support selected from the group consisting of carbon and alumina.

8. Process according to claim 7 wherein the catalyst is composed of about 90% to 99% support and about 1% to 10% palladium.

References Cited in the file of this patent
UNITED STATES PATENTS

| | | |
|---|---|---|
| 2,328,719 | Houghton et al. | Sept. 4, 1943 |
| 2,443,015 | Whitaker et al. | June 8, 1948 |

OTHER REFERENCES

Sabatier: Catalysis in Org. Chem., p. 602 (Section 603), 1923.

Berkman et al.: Catalysis, pp. 560–561 (1940).

UNITED STATES PATENT OFFICE

CERTIFICATE OF CORRECTION

Patent No. 2,829,166                                                     April 1, 1958

George G. Joris et al.

It is hereby certified that error appears in the printed specification of the above numbered patent requiring correction and that the said Letters Patent should read as corrected below.

Column 1, line 16, for "process" read -- processes --; line 24, for "and when" read -- and then --; column 6, line 37, for "on more" read -- no more --.

Signed and sealed this 27th day of May 1958.

(SEAL)
Attest:

KARL H. AXLINE
Attesting Officer

ROBERT C. WATSON
                                                                      Commissioner of Patents